United States Patent [19]

Balch

[11] 4,344,414
[45] Aug. 17, 1982

[54] SOLAR-EARTH THERMAL SYSTEM

[76] Inventor: Joseph C. Balch, S.R. Box 90550, Fairbanks, Ak. 99701

[21] Appl. No.: 119,185

[22] Filed: Feb. 6, 1980

Related U.S. Application Data

[63] Continuation-in-part of Ser. No. 898,864, Apr. 21, 1978, Pat. No. 4,205,718.

[51] Int. Cl.³ .............................................. F24J 3/02
[52] U.S. Cl. .................................. 126/434; 126/435; 126/436; 165/45
[58] Field of Search ................... 165/45, 485; 62/260; 126/400, 430, 434, 435, 436

[56] References Cited

U.S. PATENT DOCUMENTS

| | | | |
|---|---|---|---|
| 2,554,661 | 5/1951 | Clancy | 165/45 |
| 2,689,090 | 9/1954 | Wetherbee et al. | 62/260 X |
| 2,780,415 | 2/1957 | Gay | 165/18 |
| 3,220,470 | 11/1965 | Balch | 165/45 |
| 3,472,314 | 10/1969 | Balch | 165/45 |
| 3,908,753 | 9/1975 | Balch | 165/45 X |
| 4,277,946 | 7/1981 | Bottum | 62/260 X |

Primary Examiner—Albert W. Davis
Assistant Examiner—Margaret A. Focarino
Attorney, Agent, or Firm—Berman, Aisenberg & Platt

[57] ABSTRACT

A heating and cooling system utilizing solar, or other energy, includes a solar heat collector having fluid ducts connected to the lower portion of a buried fluid thermal unit, which transfers collected heat to an underground storage area. The thermal unit provides fluid convection flow between portions of the unit surrounded by lower and upper heat transfer jackets. A heat pump, installed in a building to be heated or cooled, has ducts for selectively circulating fluid between the heat pump and the upper and lower heat transfer jackets of the buried thermal unit. In another embodiment of the system one or more thermal units are provided with only lower heat transfer jackets. Such thermal unit would be useful in heating the earth surrounding the buried thermal units, and particularly useful in thawing frozen ground.

4 Claims, 13 Drawing Figures

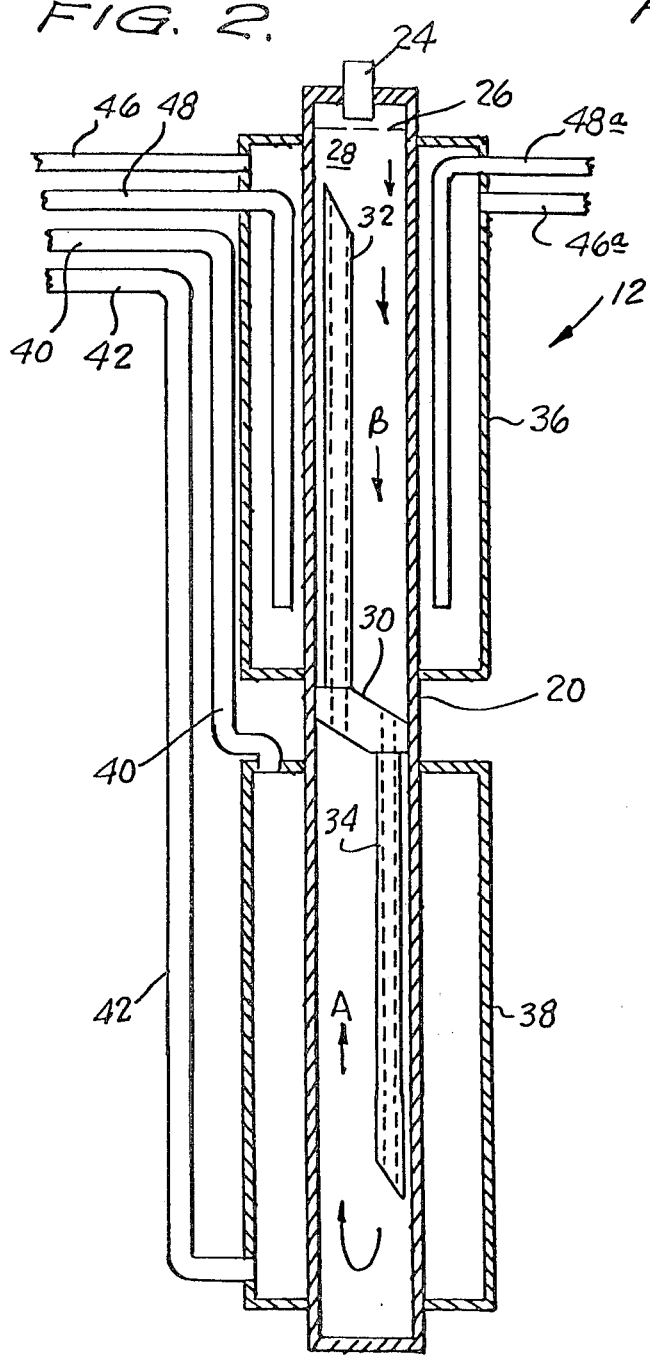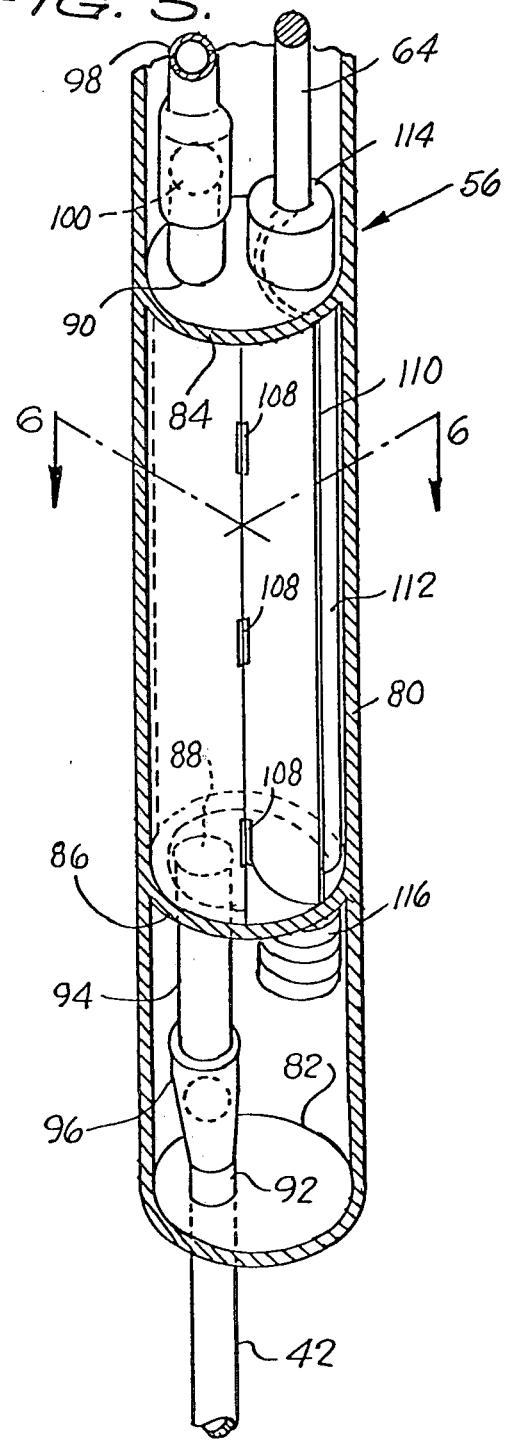

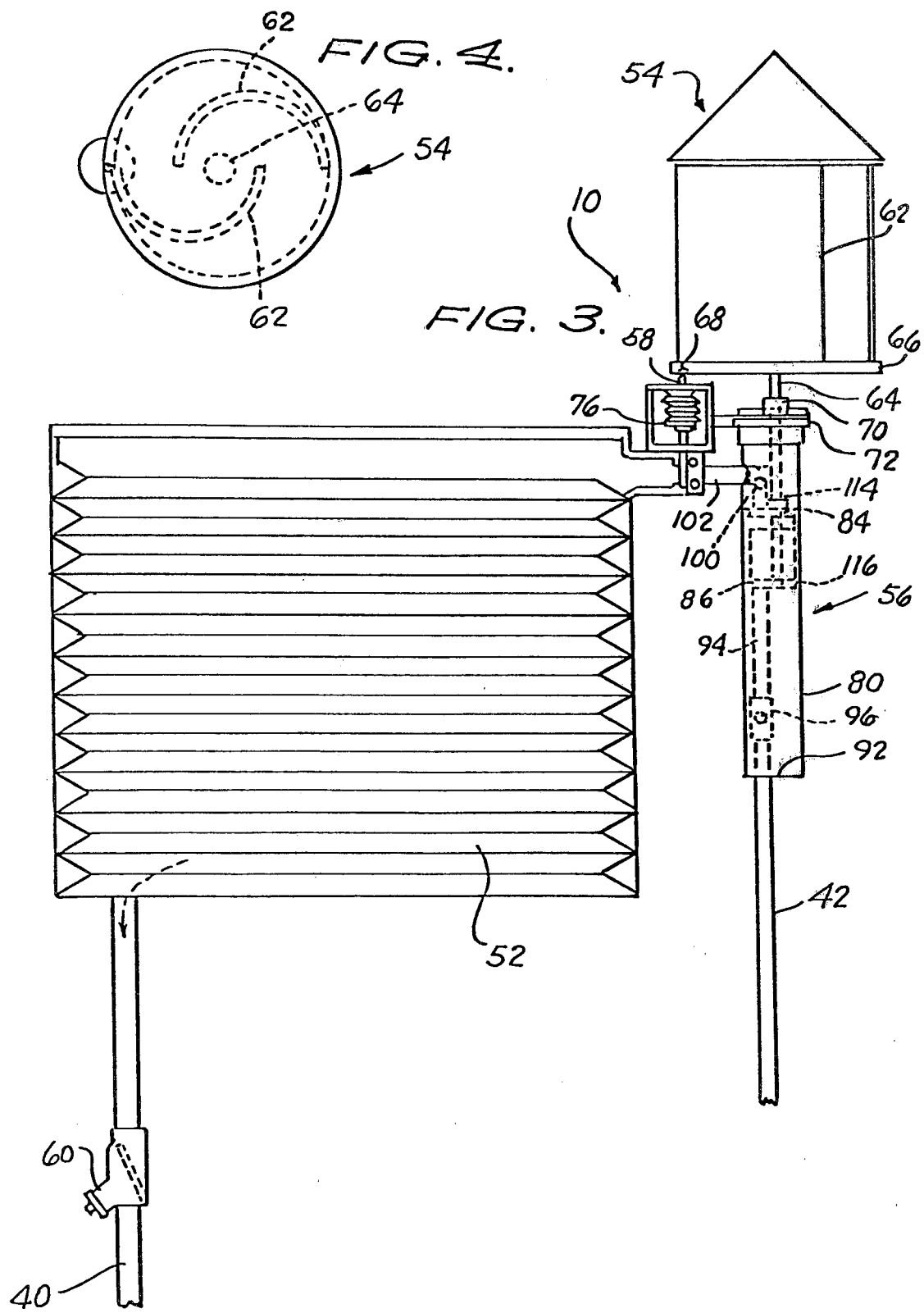

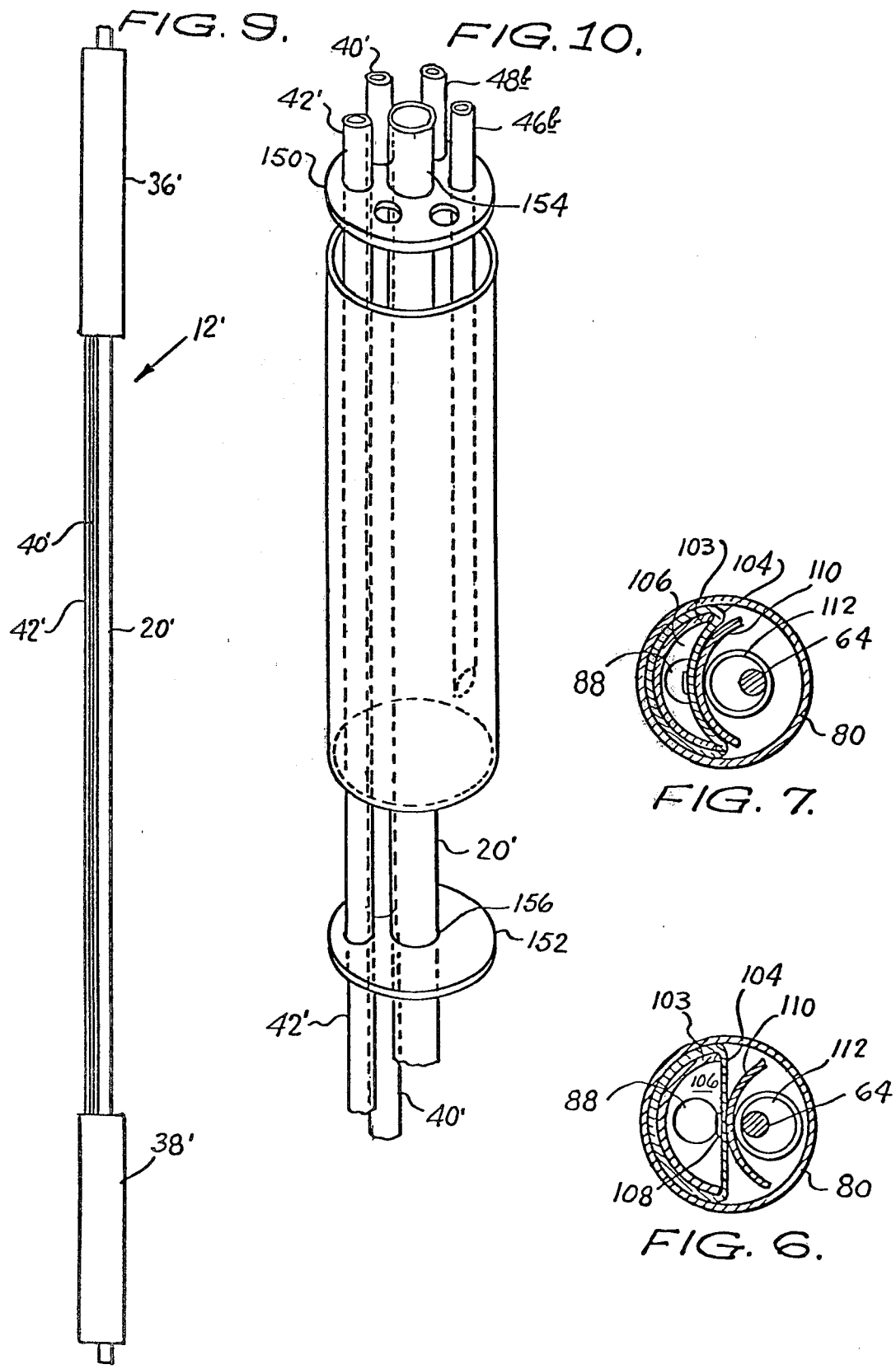

SOLAR-EARTH THERMAL SYSTEM

CROSS REFERENCE TO RELATED APPLICATIONS

The present application is a continuation-in-part of application Ser. No. 898,864, filed Apr. 21, 1978, now U.S. Pat. No. 4,205,718.

The subject matter of the present application is related to the following U.S. patents issued to Joseph C. Balch: U.S. Pat. No. 26,387, granted May 7, 1968; U.S. Pat. No. 3,472,314 issued Oct. 14, 1969; U.S. Pat. No. 3,648,767 issued Mar. 14, 1972; and U.S. Pat. No. 3,908,753 issued Sept. 30, 1975.

BACKGROUND OF THE INVENTION

1. Field of the Invention

This invention relates generally to heating and cooling systems, and more particularly, but not by way of limitation, relates to an improved heating and cooling system utilizing solar, or other energy for a heat source, and a buried thermal unit for transfer of heat to the earth for storage and subsequent transfer to a heat pump which may be reversed, for heating or cooling a structure, a body of material, or the like.

2. Description of the Prior Art

For the purpose of saving energy, it has been suggested that solar energy be collected and stored for later release and transfer to a structure to be heated. The storage means suggested usually comprise tanks of water or brine, or piles of rocks, or the like, through which fluid heat transfer pipes are run for ultimate transfer of heat to the building. Such storage means require a great deal of space, and are therefore, normally limited in size and capacity. This also limits the amount of time the heat can be stored, so that frequently the known systems are inoperative to deliver the required amount of heat.

SUMMARY OF THE INVENTION

The present invention contemplates a heating and cooling system utilizing solar, waste, or other available heat sources, simplified apparatus for transferring and storing the heat in the ground, or in other natural bodies, a heat pump installed in a structure, or body of material, to be heated or cooled, and duct means connecting the heat pump to a heat transfer unit forming part of the apparatus buried in the storage area.

It is, therefore, a primary object of the present invention to provide an improved heating and cooling system utilizing simpler apparatus and operating much more efficiently than conventional solar energy systems.

It is another important object of the invention to provide a heating and cooling system, which is easy to install, and which has long life, and requires little or no maintenance over long periods of time.

It is a further important object of the invention to provide a heating and cooling system utilizing radiant, or waste energy, and storing such energy in a large, efficient storage medium, and which is operative to perform its heating or cooling function adequately over entire seasons, or long periods of time, despite excessive variations in, or even nearly complete disappearance of the source of radiant energy during a lengthy season.

It is a further object of the invention to provide an improved method for heating and cooling which includes the steps of: collecting heat from a source, storing said heat in underground storage means, and conveying heat from said storage means to a heat pump in an installation to be heated or cooled.

It is still a further object of the invention to provide an improved apparatus for warming or heating the earth or other matter and to thaw frozen ground, such as arctic permafrost. Such a heating system is both efficient and energy saving in its thawing of permafrost to make in-ground reservoirs for water supply as well as thawed leach fields for sewage waste disposal, and like applications.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description of specific embodiments when read in connection with the accompanying drawings, wherein like reference characters indicate like parts throughout the several figures, and in which:

FIG. 2 is a diagrammatic, elevational view, partly in section, of a typical thermal cell, for earth burial forming a part of the system of FIG. 1;

FIG. 3 is an enlarged, diagrammatic elevational view of the other solar collector and connected apparatus;

FIG. 4 is a top plan view of the wind turbine of FIG. 3;

FIG. 5 is an enlarged diagrammatic, elevational view of the diaphragm fluid pump of FIG. 3;

FIG. 6 is a reduced sectional view along lines 6—6 of FIG. 5, looking in the direction of the arrows;

FIG. 7 is a view similar to FIG. 6 but showing the pump cam rotated 180°;

FIG. 9 is a view similar to FIG. 2, but showing a modified thermal cell for earth burial;

FIG. 10 is an enlarged, exploded perspective view of the upper heat transfer jacket of the cell shown in FIG. 9;

DESCRIPTION OF THE BASIC PREFERRED EMBODIMENTS

Figure 1:
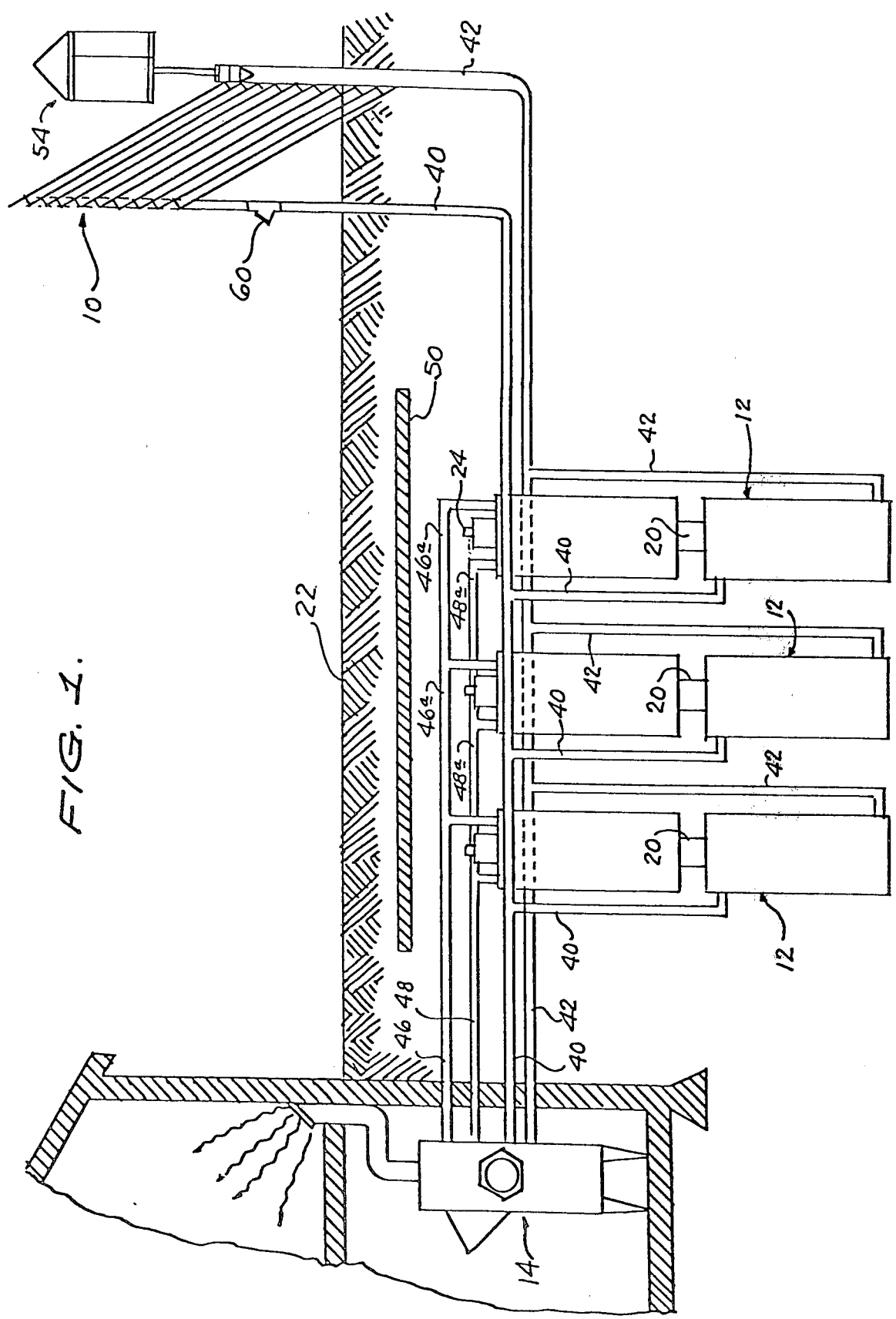
FIG. 1 is a diagrammatic, elevational view of a heating-cooling system according to the invention, which utilizes the earth as a heat storage means and a solar collector as a source of heat energy.

As shown in FIG. 1, the preferred embodiment of a heating-cooling system according to the invention includes a source of heat, such as solar collector 10, connected by ducts to one or more thermal cell units 12, buried underground as a heat reservoir, and which are in turn connected to a heat pump 14 installed in a building 16, for heating, or cooling, thereof.

The thermal cell unit 12, as best illustrated in FIG. 2, is quite similar in structure to the temperature control tubes fully described in U.S. Pat. Nos. 3,472,314 and 3,678,717, there being however structural improvements, and variations in the mode of use, mode of functioning, and connections to accessory apparatus. Thermal cell unit 12 comprises an elongated pipe 20 of metal or other suitable material, which is entirely buried under the earth surface 22, FIG. 1 and filled through a filler opening, normally closed by cap 24, to a level shown at 26, with a refrigerant medium 28 having a low freezing and a high boiling temperature, such as ethylene glycol mixed with water, alcohol and water, brines, alcohol and brine, or a large number of petroleum based products, such as gasoline, or jet fuel. Centrally of tube 20 is disposed a generally horizontal baffle plate 30, of molded plastic, molded rubber, or metal, which separates fluid 28 into upper and lower temperature zones, or compartments, between which the fluid circulates by convection. To this end the baffle 30 has a pair of openings in which are fitted an upstanding riser pipe 32 and a downwardly projecting drop tube 34, the former extending to a level near the top, and the latter to a level near the bottom of tube 20. The pipes 32 and 34 may be formed of plastic, metal or other suitable materials. Warmer fluid 28 in the bottom portion of tube 20 will rise following arrows A, enter riser 32, and exit into upper compartment of tube 20. Cooler fluid 28 in the upper compartment will descend, following arrows B, enter drop tube 34, and exit into the lower compartment. Thus a circulation of fluid 28, arising from temperature differences and changes, constantly occurs in tube 20.

Upper and lower heat transfer jackets, 36 and 38 respectively, surround and are affixed to the upper and lower portions of tube 20. These jackets are filled with a fluid, such as ethylene glycol, and/or water, or an alcohol mixture with water. The lower jacket 38 is fed warm fluid from the solar collector 10, or the heat pump 14, through duct 40 opening into the top of the jacket, see arrow C. A return duct 42, opening to the bottom of jacket 38, carries cooled fluid from the lower jacket either to the solar collector or the heat pump. Outlet duct 46 leading from the top of upper jacket 36 carries warmed fluid to the heat pump, and inlet duct 48 returns cooled fluid from the heat pump to the upper jacket. Thus the upper jacket affords a means for transferring a heated fluid to the heat pump. Corresponding ducts 46a and 48a communicating with the upper jacket are provided for connecting one or more thermal cell units 12 to each other in parallel, see FIG. 1.

The earth surrounding the thermal cell units 12, acts as a source of heat as well as a heat sink. When the temperature of the earth is higher than that of the cell units, heat passes by conduction and radiation into the unit. When the temperature of the surrounding earth is lower than that of the units, or portions thereof, heat passes from the units to the earth. In this way heat from the solar collector, and from the heat pump, when the latter is cooling building 16, passes to the earth to replenish heat previously removed. Thus the combination of the earth and cell units 12 operates with reverse action, and in a novel manner with respect to the thermal tubes described in U.S. Pat. Nos. 3,472,314 and 3,648,767, which function only to remove heat from the earth.

The insulation shield 50 is installed at the time cells are buried, and functions to slow radiation of heat stored in the earth. The shield is preferably a styrofoam panel, but any number of foams, plastic or other insulating materials, compatible with the earth, may be used instead. For light applications, such as heating and cooling a small dwelling, the shield may be unnecessary, as sufficient heat will remain stored in the earth for long periods without the shield.

The solar collector 10, see FIGS. 1 and 3–7, comprises as its major parts a thin corrugated casing 52 forming elongated fluid passageways from inlet ducts 42 and 102 to outlet duct 40, a wind turbine 54 driving a diaphragm pump 56, a thermostatic bellows device 58 for stopping the turbine, and a check valve 60 for preventing reverse flow when warm fluid is fed from the heat pump toward the cells 12 and solar collector 10. The collector casing 52 may be made much smaller than normal solar heat collection devices, because of the great capacity of the earth to store the collected heat for long periods of time. Otherwise the collector casing 52 is conventional in structure. The wind turbine 54 functions as a slow-moving drive device to operate pump 56 and circulate warm fluid such as ethylene glycol, from casing 52 through check valve 60, duct 40 to the tops of the lower cell heat transfer jackets 38, out of the bottoms of jackets 38, through ducts 42 and back to pump 56.

Wind turbine 54 and thermostatic device 58 are similarly structured and function in the manner fully described in U.S. Pat. No. 3,908,753, particularly the FIG. 6 embodiment. Briefly, the wind turbine 54 includes a pair of opposed, offset, semicircular vanes 62, 62 turned by the wind and fixed to a dependent shaft 64 and a bottom disc 66 having a notch 68 on its under side. Shaft 64 is journalled in a bearing 70 passing through cap 72 in pump 56 and has its lower end passing through an eccentric opening in the cylindrical cam 112. The thermostatic device 58 is supported by brackets from the inlet 102 of solar collector casing 52, and includes a bellows 76 having a detent pin 78 protruding upwardly from its top. Under normal ambient temperatures or higher temperatures, the bellows 76 is expanded; the detent pin is lowered, and the wind vanes 62 are free to turn. However, under low ambient temperatures the bellows contract, causing detent pin 78 to enter notch 68 and stop the turbine from revolving. This of course stops pump 56 and prevents further circulation of fluid from solar collector 10 to the thermal units 12 until the ambient temperature rises sufficiently to remove the pin and restart the circulation of fluid between the solar collector and the buried thermal cell units.

The diaphragm pump 56, as best illustrated in FIGS. 5–7, is an improvement over the screw type propelling means, described in U.S. Pat. No. 3,908,753, since it permits slow pumping operation under very light prevailing breezes, which with the patented device would be inoperative to circulate fluid between the solar collector and the buried thermal units. Pump 56 is housed within an elongated, vertically disposed, tubular casing 80. The casing is closed at the bottom by disc 82 and at the top by disc 72, both secured to the casing in any suitable manner. Third and fourth discs 84 and 86 are secured within the casing 80 to form a compression chamber. Disc 86 has an opening 88 aligned with similar openings 90, 92 in upper disc 84 and bottom closure 82, respectively. The cold fluid inlet duct 42 is connected in opening 92 and the pipe 94, having a ball check valve 96 therein, is connected between openings 92 and 88. Check valve 96 includes a ball valve which closes in its lowermost position. Opening 90 in the upper disc is connected by pipe 98, having a check valve 100 therein, to the inlet 102 of solar collector panel 52. Check valve 100 also houses a ball valve closed when its lowermost position. Housed between discs 84 and 86 is a rigid, metal, or other semi-cylindrical support 103 for the resilient diaphragm 104. The diaphragm, of rubber, or like material, is a tubular sheet surrounding the support plate and closing the diametrical chord across the open side of the support so as to form a chamber 106 between discs 84 and 86 and communicating with the pipes 94 and 98. The diaphragm is secured by a series of fasteners 108 to a vertically disposed semi-cylindrical cam striker plate 110 extending nearly the full height between the discs 84 and 86. A vertically disposed, cylindrical cam 112 is rotatably supported between discs 84 and 86 and the wind turbine drive shaft 64 passes vertically through an eccentric opening in the cam and is fixed to the cam in any suitable manner. The shaft 64 is journalled in an upper pump bearing and seal block 114 on disc 84, and re-supported at its bottom in a lower bearing block 116, fixed to the underside of disc 86.

It will be apparent from the above description, that when the wind turbine is turning, the drive shaft 64 rotates cam 112 so as to move the curved striker plate 110 alternately between the positions shown in FIGS. 6 and 7. In the FIG. 6 position chamber 106 is at its largest size and in its suction condition so that the cooled fluid enters the chamber from pipes 42 and 94 lifting and passing valve 96. As the cam striker plate 110 moves from its FIG. 6 to its FIG. 7 position, the chamber 106 is reduced in volume, compressing the fluid therein and forcing the fluid upwardly to lift ball valve 100 in pipe 98, and to pass into the solar inlet pipe 102, FIG. 3. Thus while the wind turbine is turning, even slowly under the influence of very light breezes, pump 56 will circulate fluid between the thermal cell units 12 and the solar collector 10. The fluid warmed in the solar collector gives up its heat to be stored in the earth at the thermal units, as previously explained.

Figure 8:
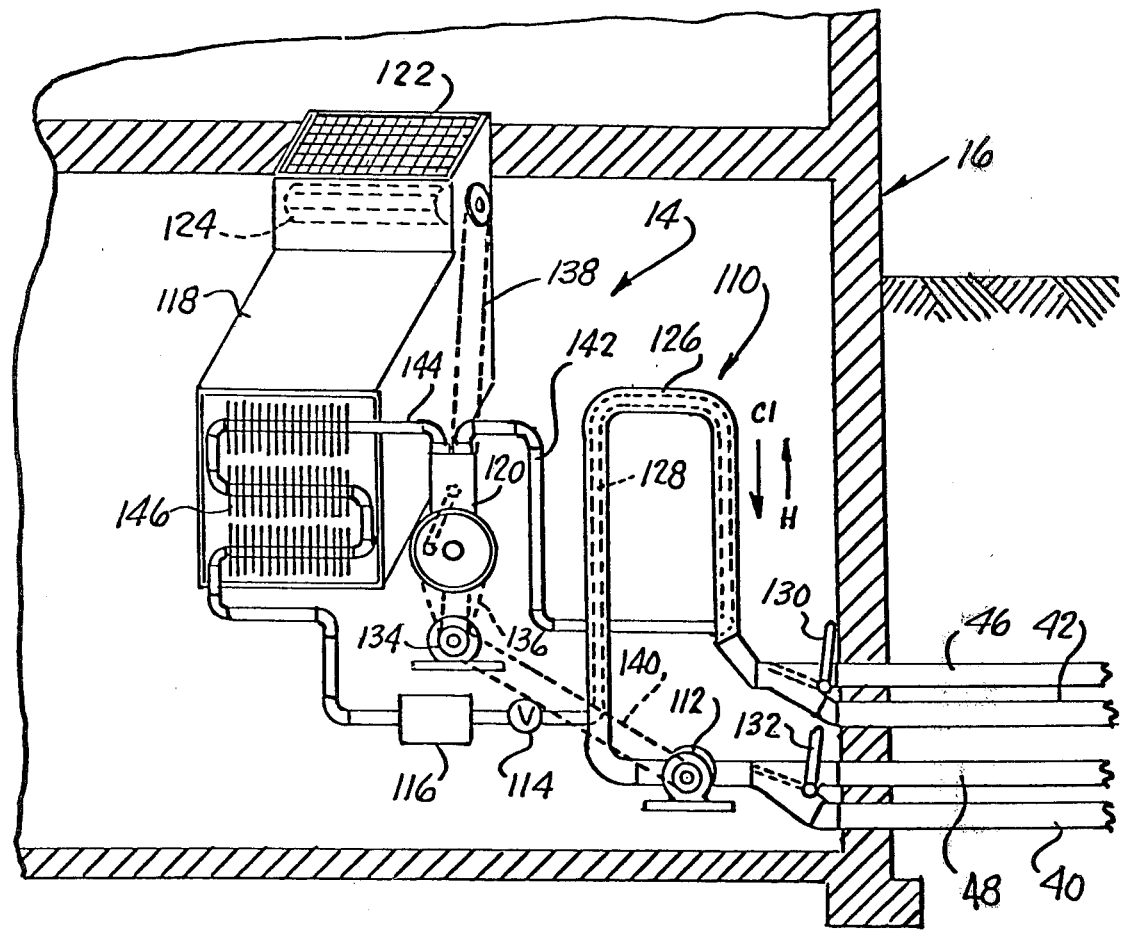
FIG. 8 is an enlarged diagrammatic perspective view of the heat pump of FIG. 1 and connected apparatus.

The heat pump 14 may be of any conventional type. A typical heat pump is diagrammed, as installed for heating structure 16, in FIG. 8. Briefly described, the pump 14 is connected to a heat exchanger 110 and a circulation pump 112, and includes an expansion valve 114, receiver 116, convector 118, compressor 120, register 122 with fan 124. The heat exchanger 110 comprises a pipe loop 126 housing an internal pipe 128. One end of pipe 126 is connected to ducts 46 and 42, leading to the upper and lower jackets 36 and 38 respectively of the thermal cell units 12, by a manually-operated, two-way valve 130. The other end of heat exchanger pipe 126 is similarly connected to ducts 48 and 40 leading to the upper and lower jackets respectively of the thermal cell units 12, by another manually operated two-way valve 132. Thus warmed fluid is brought through pipe 46 to pipe 126 and circulated counter-clockwise, as shown by arrow H, the pump 112 forcing the ethylene glycol fluid cooled in exchanger 110 back through valve 132 and duct 48 to the upper jackets 36 of the cell units 12. When valves 130 and 132 are manually changed to close ducts 46 and 48 and open ducts 42 and 40, cooler glycol fluid from the bottoms of lower jackets 38 is brought to pipe 126, circulated clockwise and returned through duct 40 to the tops of lower cell unit jackets 38. A motor 134 drives compressor 120 by belt 136. A second belt 138 from the motor shaft drives fan 124, while a third belt 140 drives circulation pump 112. The inner heat exchange pipe 128 is connected by pipe 142 to one side of the compressor and by pipe 144 to a serpentine, finned pipe 146 in the convector 118. The other end of pipe 146 is connected through receiver 116 and expansion valve 114 to the other end of heat exchanger inner pipe 128. A refrigerant such as Freon fills pipe 128 and the connected pipes and parts.

The heat pump 14 described above is, except for heat exchanger 110 and its connections, a conventional two-way heat pump, and includes manually or electrically operated changing cycle transfer valves and switches, not shown. Accordingly when the heat pump 14 is to be used for cooling structure 16, the motor 134 and the pump 112 are reversed and the flow of fluids in pipes 126 and 128 of the heat exchanger 110 is clockwise in both as indicated by arrow C'. Under these circumstances, and with valves 130 and 132 moved to open ducts 40 and 42 and close ducts 46 and 48, ethylene glycol is brought from the tops of lower cell jackets 38 through duct 40, clockwise through pipe 126 and returned to the bottoms of jackets 38 through ducts 42. During passage through pipe 126, heat is transferred to the Freon flowing clockwise through pipe 128. The warmed Freon is compressed in compressor 120 and expands in pipe 146 of convector 118, absorbing heat from air being pulled through the convector toward register 122, so that cooler air is blown through the register into the building 16.

From the above description, operation of the FIG. 1 system to both heat and cool a building will be apparent. Heat imparted to the fluid in solar collector 10 is circulated through duct 40 to lower heat transfer jackets 38 and returned to the collector through duct 42. Jackets 38 impart heat both to the earth and to fluid in tube 20. The earth acts as a heat sink to store heat and to release heat transferred from and back to the thermal units 12. From their upper jackets 36, fluid circulates through pipe 126 of heat exchanger 110 to warm the Freon in pipe 128. This warmed Freon in turn is circulated through pipe 146 where heat is released to air blowing through the register 122. The performance of a heat pump increases in efficiency as the condensing and cooling coil temperature approach each other. Therefore, during the heating cycle, if a warmer source can be found than the ambient air, an increase in performance can be expected. As the thermal tubes 12 are buried in the earth, they achieve a more consistent high temperature than otherwise could be expected from the ambient air.

The reversal of flow in heat pump 14 and heat exchanger 110 to accomplish cooling of building 16 has been adequately described above. It should be noted that during cooling, ducts 40 and 42 are open to both the heat pump 14 and the solar collector 10. For this reason, one-way check valve 60 is inserted near the solar collector to prevent flow of fluid from the heat pump to the collector. As the wind turbine induced pressure of the fluid passing through the solar collector is very low compared to the pressure induced at heat pump 112, the check valve stops the fluid from flowing from the solar collector while the heat pump is operating to cool the structure; but, when the heat pump is not in cooling operation, the circulation is available from the collector.

The described heating-cooling system is much more efficient than a conventional system because in common systems, using storage tanks filled with heated material such as water, rocks, or the like, a 2,000 gallon tank would be about 270 cubic feet of storage; on the other hand, a 21 foot thermal tube inserted into the earth at a depth of 30 feet would have not less than 2,500 cubic feet of heat storage and exchange from the surrounding earth. Thus by storing heat underground, or in the ground, it is there for months and not days as in the conventional system. In some cases one thermal tube may be all that is required if its base is in warm earth or water of 45, or more, degrees Fahrenheit. Much depends upon location and soil conditions. With a parallel hook-up of thermal tubes, one can expect ample heat all winter. It must be understood that with a proper heat pump the thermal tube could remove enough heat from the soil to cause permafrost in any of the 50 states of the United States. In order to prevent freezing of the soil, heat needs to be replenished, a capability of the present invention not existing in conventional systems.

DESCRIPTION OF THE FIG. 9 EMBODIMENT

In FIGS. 9 and 10 is illustrated a modified thermal cell unit 12' which eases the installation in the ground by enclosing all connecting ducts within the confines of upper heat transfer jacket 36', thus eliminating the need to dig holes in the earth for some of the ducts. The upper and lower jackets 36' and 38' are preferably identical cylindrical tubes. A disc 150 and equal diameter disc 152 are welded or otherwise sealingly secured to the top and bottom of jacket 36'. The thermal tube 20' constructed as explained for the FIG. 2 embodiment, is passed through central opening 154 in the cover disc and through opening 156 in the bottom closure disc and extends down and through jacket 38' having upper and lower closures identical to disc 152. Tube 20' is welded or otherwise sealed in the openings 154, 156 of all closures through which it passes. The opening 156 in the closure at the bottom of jacket 38' is filled and sealed by a plug. Cover disc 150 has six spaced openings through which the ducts corresponding to those of the FIG. 2 embodiment pass into jacket 36'. These ducts are numbered 40', 42', 46', 48' and 46b and 48b. Ducts 40' and 42' pass through openings in disc 152 at the bottom of jacket 36' and extend to and through corresponding openings in disc 152 at the top of lower jacket 38'. The openings in the bottom closure disc for jacket 38' are plugged and the central opening in the top closure 150 is capped.

It will be apparent that the modified thermal cell unit has virtually the same structure and therefore operates in the same manner as the FIG. 2 embodiment, its advantages lying in ease of fabricating, assembly, and installation in the ground.

The length and diameter of the thermal tube 20 or 20' can vary to extremes. Tests have proven that tubes made as small as 8 inches long work effectively and tubes as long as 150 feet operate effectively. Diameters have been used ranging from 1 inch or less to some units having diameters as much as 60 inches. It is expected that a range of 10 feet to 200 feet for length with a 2 to 12 inch diameter of the thermal tube would cover the majority of applications. A standard tube is expected to be made out of 2 inch diameter tubing with 4 inch diameter jackets.

The depth of burial of the thermal cell unit depends upon the soil conditions. A standard tube is expected to be about 21 feet in length. The top would be buried about 3 or 4 feet below the earth's surface, well below frost lines.

In the FIG 2 embodiment, tubes 32 and 34 are normally made of polyethylene plastic pipe and are made of double wall pipe for insulation benefit of a small air space. For tubes longer than 40 feet a metal pipe with a foam plastic insulation is desirable.

It is preferable that all duct pipes connecting the thermal unit transfer jackets to the heat pump and solar collector be double walled with an air space between pipes, or have an outer wall of insulating material to prevent heat losses from the ducts.

Considering the above description of the structure and operation of the heating-cooling system, it should be obvious that it is not necessary to install nearly as large or nearly as many solar collectors as in conventional systems, and that alternative heat sources can be utilized, such as the surfaces of roadways, walkways, parking lots, roof surfaces, walls, fences, etc. It is estimated that, for example, a one acre asphalt parking lot having plastic pipe installed near its surface and being in direct sunshine would absorb ample heat to replenish the earth with enough heat in two days to supply a 10,000 square foot structure with heat for a month or more in any of the northern tier states.

Instead of the wind turbine and diaphragm pump, an electric motor and pump may be used to circulate fluid between the heat source (solar collector) and the thermal cell units. While one example of a heat pump has been described, other well known ways may obviously be substituted. The thermal cell units need not be buried in earth, but may be sunk in bodies of surface or underground water, or bodies of other materials constituting good heat storage capabilities. Finally the heat source need not be the sun, as alternatively, wind, air or exhaust energy may be utilized and stored in the earth.

Evaluation tests indicate that a century of maintenance-free service can be obtained from the buried thermal cell units, depending upon proper selection of materials. It has also been estimated that the present heating-cooling system requires the expenditure of only one fourth the energy of an all electric heating-cooling system yielding the same output.

DESCRIPTION OF FIG. 11 EMBODIMENT

Figure 11:
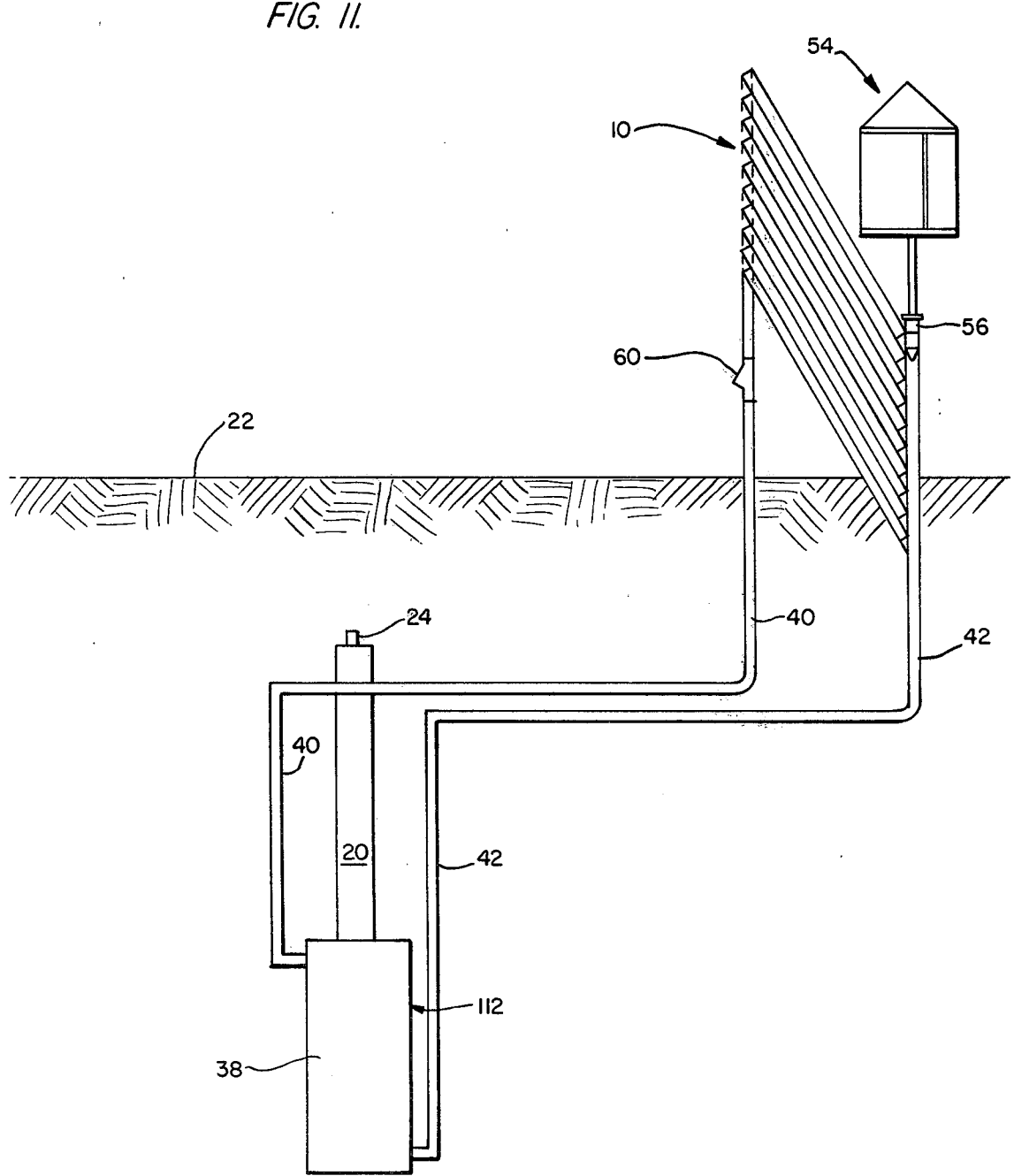
FIG. 11 is a diagrammatic, elevational view of another embodiment of the present invention, which is utilized in heating the earth surrounding the buried thermal cells.

Another embodiment of the system of the present invention is shown in FIG. 11, and includes a modified thermal cell unit designated as 112 and intended to be buried below the earth's surface 22. Thermal cell unit 112 is the same as thermal cell unit 12, except that it has only a lower thermal transfer jacket 38 and does not include an upper thermal transfer jacket as does thermal cell unit 12. As in the operation of thermal unit 12, the modified thermal unit 112 is in communication with a fluid duct 40 as well as a fluid duct 42. Specifically, ducts 40 and 42 are introduced into the lower transfer jacket 38.

In the operation of modified thermal unit 112, heat is imparted to a fluid as it flows through the solar collector 10, and the heated fluid is circulated through duct 42 to the lower heat jacket 38 and returned to the collector 10 through duct 40 by means of wind turbine 54 and diaphragm fluid pump 56. Thus, the direction of fluid flow in this embodiment is opposite that of the heretofore discussed embodiments, since the heated fluid is taken from the top of the solar collector 10 for reasons subsequently discussed. By conduction and convection, heat is transferred from lower jacket 38 to the surrounding earth, or other surrounding material matter, and to the refrigerant in tube 20. Also, the heated refrigerant in tube 20 will rise towards the top of the tube 20 and it too will impart at least some of its heat to the surrounding earth or other surrounding material matter. As in thermal unit 12, the refrigerant in tube 20 of thermal unit 112 circulates by convection along the length of the tube. Accordingly, it is the primary purpose of the modified thermal cell 112 to heat the surrounding earth and thaw the earth if it is frozen, such as arctic permafrost, by a simple operation which is most efficient and economical.

As shown in FIG. 11, the collector 10 is angled relative to the ground surface. The fluid at the top of collector 10 will be at a higher temperature than at the bottom, since thermal energy tends to rise. However, in an environment where one desires to thaw the ground, i.e., permafrost, the fluid at the bottom of the collector 10 may not be sufficiently high in temperature to provide this thawing effect. This is especially true when one considers that in such an environment the heating of the fluid is substantially due to solar radiation, since the ambient air temperature would be too low to assist in heating the fluid and may in fact draw thermal energy therefrom. Thus, under such operating conditions, it is preferable to take the fluid from the top of the solar collector 10, thereby requiring a reversal of the fluid flow from the previously discussed embodiments of the present invention.

It is further anticipated that sources of heat energy other than the solar collector 10 can be used with modified thermal cell unit 112, as a constant source of heat energy will be required to prevent the refreezing of the thawed ground.

It is further anticipated that the modified thermal unit 112 could in fact be used adjacent to and in conjunction with the cooling and heating system as described with respect to FIG. 1. However, in such an instance, the primary purpose of the modified thermal unit 12 will be to warm the surrounding earth.

While only one modified thermal unit 112 is depicted in FIG. 11, it is obvious that a plurality of such thermal units could be utilized in any particular location.

Figure 13:
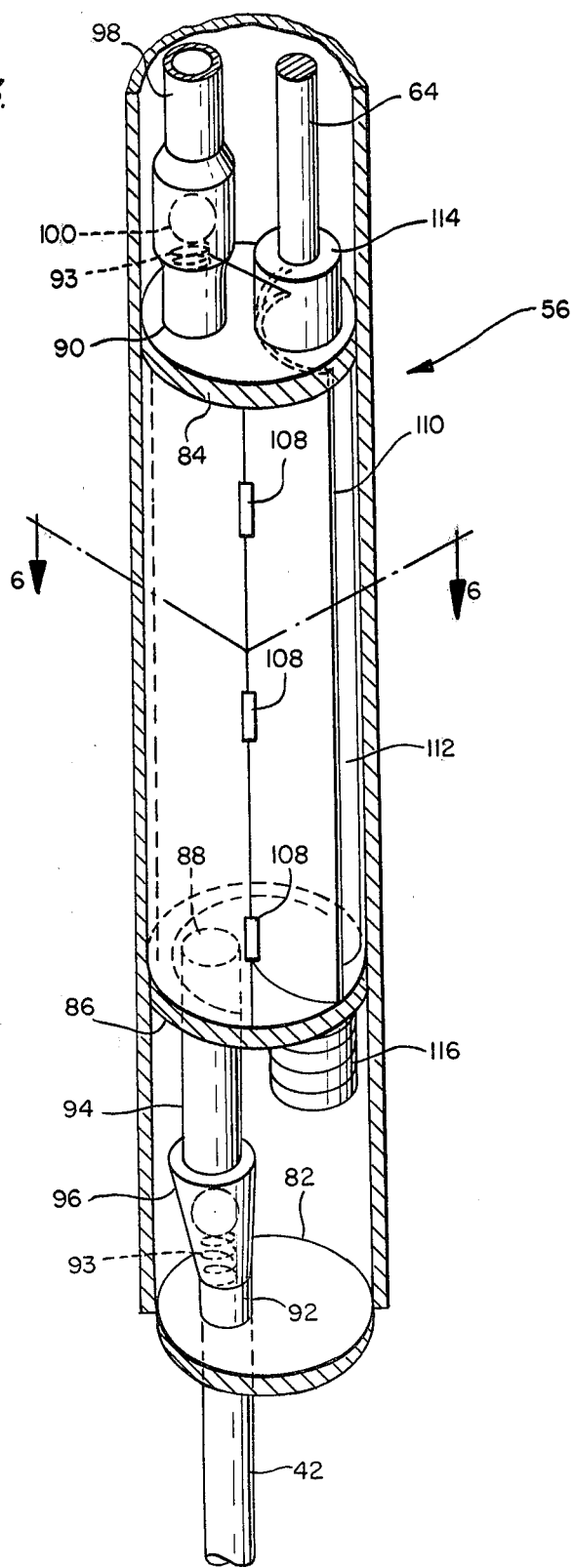
FIG. 13 is an enlarged diagrammatic, elevational view of the modified diaphragm fluid pump of FIGS. 11 and 12.

Since the flow of fluid is reversed in this embodiment of the present invention, the fluid pump 56 must be modified as shown in FIG. 13. Specifically, the gravity operated ball member of valves 96 and 100 are seated on coil springs 93 in order to maintain the valves in their opened position. All other components of the diaphragm fluid pump 56 are the same as discussed heretofore. Furthermore, the reversal in direction of the fluid flow, further requires a reversal in the operating direction of the check valve 60 from that heretofore discussed with respect to the other embodiments of the present invention. It is also anticipated by the present invention, that a conventional electric pump could be substituted for the fluid pump 56 and wind turbine 54.

DESCRIPTION OF THE FIG. 12 EMBODIMENT

In still another embodiment of the heating and cooling system of the present invention, the modified thermal unit 112 is used in conjunction with the modified thermal unit designated as 212, and together they heat the surrounding earth and a building 16.

Thermal units 212 are the same as thermal units 12, except that they have only an upper heat transfer jacket 36, and do not have a lower heat transfer jacket. An outlet duct 46 extending from the top of the upper jacket 36 carries warmed fluid to the heat pump 14, and an inlet duct 48 returns cooled fluid from the heat pump 14 to the upper jacket 36. Thus, heated fluid is transferred from upper jacket 36 to the heat pump 14 in a manner and for a purpose substantially the same as that described heretofore.

Corresponding ducts 46a and 48a communicating with the upper jackets are provided for connecting thermal units 212 to each other in parallel.

Thermal transfer fins 213 are disposed on the tubes 20 of the thermal units 212 below the upper jacket 36. Typically, fins 213 are constructed of a material which readily absorbs heat.

Figure 12:
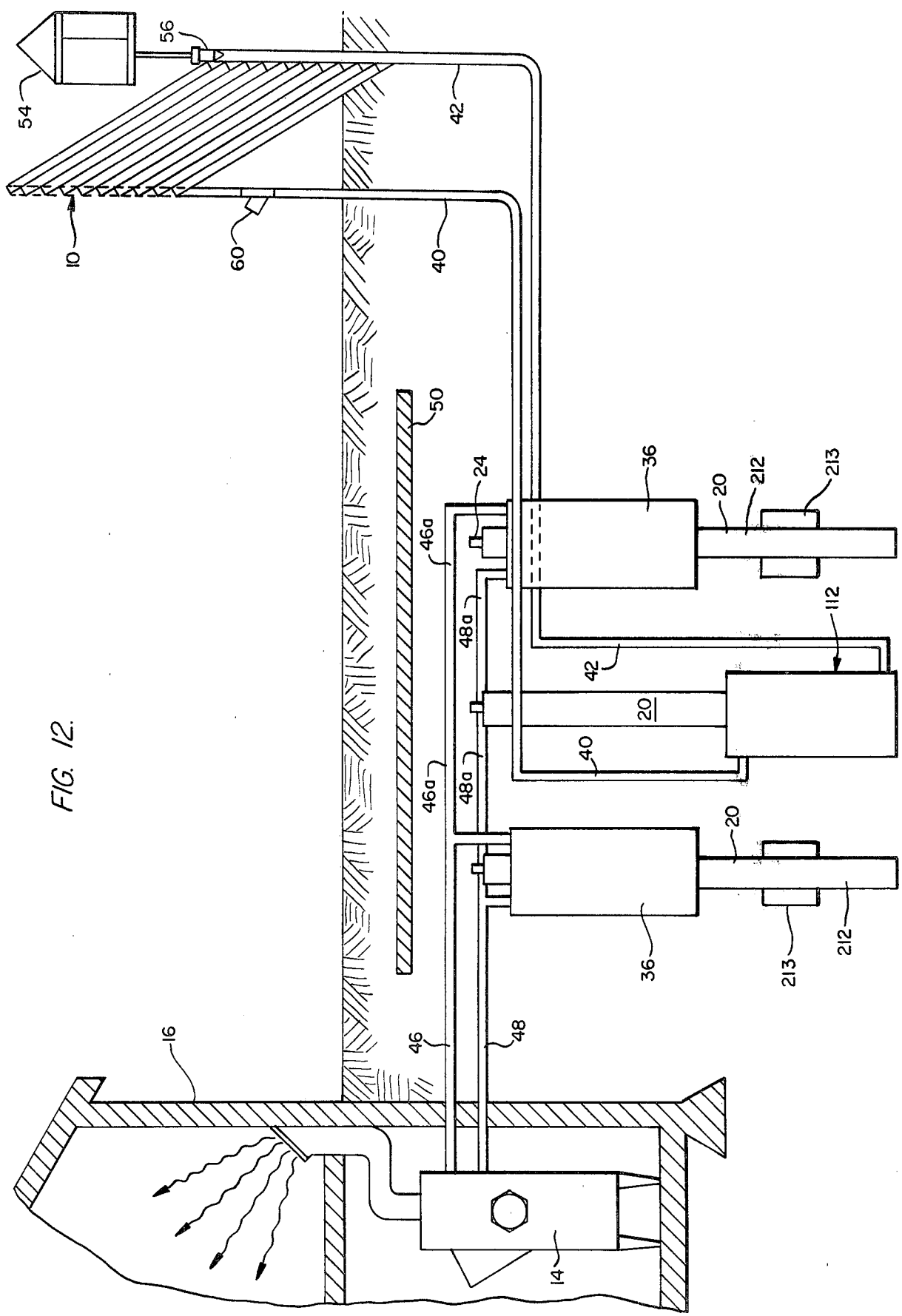
FIG. 12 is a diagrammatic, elevational view of another embodiment of the heating-cooling system of the present invention.

In the operation of the heating and cooling system as shown in FIG. 12, heat will be imparted from thermal unit 112 to the surrounding earth as described heretofore. While a portion of the radiating heat will be utilized to warm the surrounding ground or thaw the ground, some of the heat will be absorbed by the fins 213 and by other portions of the thermal units 212. The heat absorbed by the fins 213 will heat the refrigerant circulating in the lower portion of the tube 20, and the heated refrigerant will rise towards the top of tube 20 and will in turn heat the fluid in the upper jacket 36. This heated fluid is then transferred from the upper jacket 36 to the heat pump 14 by means of duct 46. In a manner previously described, the heated fluid carried by ducts 36 to heat pump 14 is thereafter utilized to heat the building 16. The heated fluid is consequently cooled and thereafter returned to the upper jacket by duct 48. Thus, the system of the present invention as shown in FIG. 12, can function both to heat the earth surrounding the buried themal units as well as an adjacent or nearby building.

It is further anticipated by the present invention that the modified thermal units 12' can be employed, with obvious modifications, in the embodiments of the present invention as shown in FIGS. 11 and 12.

Although certain specific embodiments of the invention have been shown and described, it is obvious that other modifications thereof are possible. The invention, therefore, is not intended to be restricted to the exact showing of the drawings and description thereof, but is considered to include reasonable and obvious equivalents.

What is claimed is:
1. A heating system comprising:
    (a) means for collecting and transfering heat to a fluid medium,
    (b) at least one fluid thermal unit comprising an elongated thermal tube for conducting heat from one end thereof to the other end thereof, and a heat transfer jacket at said one end of said thermal tube for receiving said fluid and for conducting said heat to said one end,
    (c) duct means for conducting said fluid from said means for collecting to said heat transfer jacket and wherein said fluid thermal element is buried in the earth so that said one end of said elongated thermal tube is below the other end of said elongated thermal tube and said heat transfer jacket receives said fluid from said means for collecting and transfering heat,
    whereby heat from said means for collecting and transferring may be transmitted to the earth for storage thereof or for the thawing of permanfrost.
2. A heating system according to claim 1, wherein said means for collecting and transferring heat is a solar radiation collector.

3. The heating system according to claim 1, comprising a plurality of buried thermal units.

4. A heating system according to claim 2 wherein:
said solar radiation collector comprises a generally flat panel which is at an angle to the earth,
said heat transfer jacket has an inlet port for said fluid which is further from said one end than is an outlet port, and
said duct means connects a lower portion of said solar radiation collector to said inlet port and an upper portion of said solar radiation collector to said outlet port.

* * * * *